United States Patent
Yoo et al.

(10) Patent No.: US 9,269,965 B2
(45) Date of Patent: Feb. 23, 2016

(54) PD-Y ALLOY CATALYST, METHOD FOR PREPARING THE SAME, AND FUEL CELL COMPRISING THE CATALYST

(75) Inventors: Sung Jong Yoo, Incheon (KR); Soo-Kil Kim, Seoul (KR); Seung Jun Hwang, Seoul (KR); Suk-Woo Nam, Seoul (KR); Tae Hoon Lim, Seoul (KR); Seong Ahn Hong, Seoul (KR)

(73) Assignee: KOREA INSTITUTE OF SCIENCE AND TECHNOLOGY (KR)

( * ) Notice: Subject to any disclaimer, the term of this patent is extended or adjusted under 35 U.S.C. 154(b) by 541 days.

(21) Appl. No.: 12/884,853

(22) Filed: Sep. 17, 2010

(65) Prior Publication Data
US 2011/0319256 A1   Dec. 29, 2011

(30) Foreign Application Priority Data
Jun. 29, 2010   (KR) ........................ 10-2010-0062142

(51) Int. Cl.
H01M 4/92 (2006.01)
H01M 8/10 (2006.01)

(52) U.S. Cl.
CPC ...... *H01M 4/921* (2013.01); *H01M 2008/1095* (2013.01); *Y02E 60/50* (2013.01)

(58) Field of Classification Search
CPC ................... H01M 4/921; H01M 2008/1095; Y02E 60/50
USPC ....................... 420/463; 502/5, 333
See application file for complete search history.

(56) References Cited

FOREIGN PATENT DOCUMENTS

| JP | 2005230809 A | 9/2005 |
|---|---|---|
| KR | 100280102 B1 | 3/2001 |
| KR | 100360470 B1 | 11/2002 |

OTHER PUBLICATIONS

Greeley et al.,"Alloys of platinum and early transition metals as oxygen reduction electrocatalysts", Nature Chemistry, Sep. 23, 2009, Nature Publishing Group, vol. 1, Issue 7, pp. 552-556 and appendix pp. 1-17.*
Lister et al., "PEM fuel cell electrodes", Journal of Power Sources, 2004, Elsevier, 130, pp. 61-76.*
Fletcher, S., "Thin Film Palladium-Yttrium Membranes for Hydrogen Separation", Nov. 2009, University of Birmingham, p. 1-268.*
Ito et al., "Non-conventional electrolytes for electrochemical applications", 2000, Electrochimica Acta, 45, p. 2611-2622 (p. 1-12).*
M. Lefevre, et al. "Molecular Oxygen Reduction in PEM Fuel Cells: Evidence for the Simultaneous Presence of Two Active Sites in Fe-Based Catalysts" J. Phys. Chem. B. Jul. 27, 2002, pp. 8705-8713, vol. 106, American Medical Society.
M. Lefevre, et al. "Molecular Oxygen Reduction in PEM Fuel Cell Conditions: ToF-SIMS Analysis of Co-Based Electrocatalysts", J. Phys. Chem. B, Aug. 17, 2005, pp. 16718-16724, vol. 109, American Medical Society.
R. B. Levy, et al. "Platinum-Like Behavior of Tungsten Carbide in Surface Catalysis", Science, 1973, pp. 547-549, vol. 181.
Bin Wang, "Recent Development of Non-Platinum Catalysts for Oxygen Reduction Reaction", Journal of Power Sources, 2005, pp. 1-15, vol. 152, Elsevier B.V.
Nalini P. Subramanian, et al. "Studies on Co-Based Catalysts Supported on Modified Carbon Substrates for PEMFC Cathodes", Journal of Power Sources, 2005, pp. 56-63, vol. 157, Elsevier B.V.

* cited by examiner

*Primary Examiner* — Roy King
*Assistant Examiner* — Caitlin Kiechle
(74) *Attorney, Agent, or Firm* — Cantor Colburn LLP

(57) ABSTRACT

Disclosed are a platinum (Pt)-free, palladium (Pd)-yttrium (Y) alloy catalyst having superior oxygen reduction reaction activity and stability, a method for preparing the same, and a fuel cell including the catalyst. Since the Pt-free Pd—Y catalyst is inexpensive, it may be usefully applicable for fuel cells, particularly polymer electrolyte membrane fuel cells.

10 Claims, 5 Drawing Sheets

PD-Y ALLOY CATALYST, METHOD FOR PREPARING THE SAME, AND FUEL CELL COMPRISING THE CATALYST

CROSS-REFERENCE TO RELATED APPLICATION

This application claims priority to Korean Patent Application No. 10-2010-0062142, filed on Jun. 29, 2010, and all the benefits accruing therefrom under 35 U.S.C. §119, the contents of which in its entirety are herein incorporated by reference.

BACKGROUND

1. Field

This disclosure relates to a palladium (Pd)-yttrium (Y) alloy catalyst, a method for preparing the same, and a fuel cell including the catalyst. Specifically, the disclosure relates to a Pd—Y alloy catalyst providing improved activity and stability in an oxygen reduction reaction, especially in an oxygen reduction reaction of a polymer electrolyte membrane fuel cell, a method for preparing the same, and a fuel cell including the catalyst.

2. Description of the Related Art

Since the platinum (Pt) catalyst exhibits high reaction activity in fuel cells, particularly in polymer electrolyte membrane fuel cells, it is mainly used as the catalyst for fuel cells at present.

However, the high cost and limited reserves of Pt are big obstacles to the commercial use of the Pt catalyst in fuel cells. Accordingly, efforts have been made to develop Pt-free catalysts for use as fuel cell electrode catalysts.

Existing Pt-free catalysts include cobalt-based catalysts [Non-Patent References 1 and 2], iron-based catalysts [Non-Patent Reference 3], non-noble metal catalysts [Non-Patent Reference 4] and tungsten carbide-based catalysts [Non-Patent Reference 5].

REFERENCES CITED

Non-Patent References

1. M. Lefevre, J. P. Dodelet and P. Bertrand, *J. Phys. Chem. B.* 109 (2005), p. 16718.
2. N. P. Subramanian, S. P. Kumaraguru, H. Colon-Mercado, H. Kim, B. N. Popov, T. Black, D. A. Chen, *J. Power Sources*, available online 26 Aug. 2005.
3. M. Lefevre, J. P. Dodelet and P. Bertrand, *J. Phys. Chem. B* 106 (2002), p. 8705.
4. B. Wang, *J. Power Sources* 152 (2005).
5. R. B. Levy and M. Boudart, *Science* 181 (1973), p. 547.

SUMMARY

Despite the efforts to replace the platinum (Pt) catalyst as the activation catalyst of an oxygen reduction reaction with a Pt-free catalyst, there is still no catalyst which can completely replace the Pt catalyst in performance and is inexpensive.

Surprisingly enough, the inventors have found out that a palladium (Pd)-yttrium (Y) alloy (homogenous alloy) can be used as an activation catalyst of an oxygen reduction reaction with high activity.

Accordingly, this disclosure is directed to providing a novel Pt-free, Pd—Y alloy catalyst having improved activity in an oxygen reduction reaction, especially in an oxygen reduction reaction of a polymer electrolyte membrane fuel cell, a method for preparing the same, and a fuel cell including the catalyst.

In one general aspect, there is provided a Pd—Y alloy (homogenous alloy) catalyst including an alloy of Pd and Y and having an activity for an oxygen reduction reaction.

In the Pd—Y alloy, Y may be included in 1% to 99%, specifically 1% to 50%, more specifically 5% to 32%, further more specifically 11% to 27%, particularly specifically 22% to 27%, and most specifically 22%, based on atomic composition.

In another general aspect, there is provided a fuel cell including the Pd—Y alloy catalyst in a fuel cell electrode.

In another general aspect, there is provided a method for preparing a Pd—Y alloy catalyst having an activity for an oxygen reduction reaction, including alloying Pd with Y.

The alloying of the Pd—Y alloy catalyst may be achieved by cosputter alloying, colloidal alloying, impregnation alloying or electroplating alloying.

The Pt-free Pd—Y alloy catalysts according to embodiments of the disclosure provide better activity for an oxygen reduction reaction, have better stability and are less expensive than Pt-based catalysts. Accordingly, the Pd—Y catalyst is useful for fuel cells, particularly for polymer electrolyte membrane fuel cells, and will contribute a lot to the commercial use of the fuel cells.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
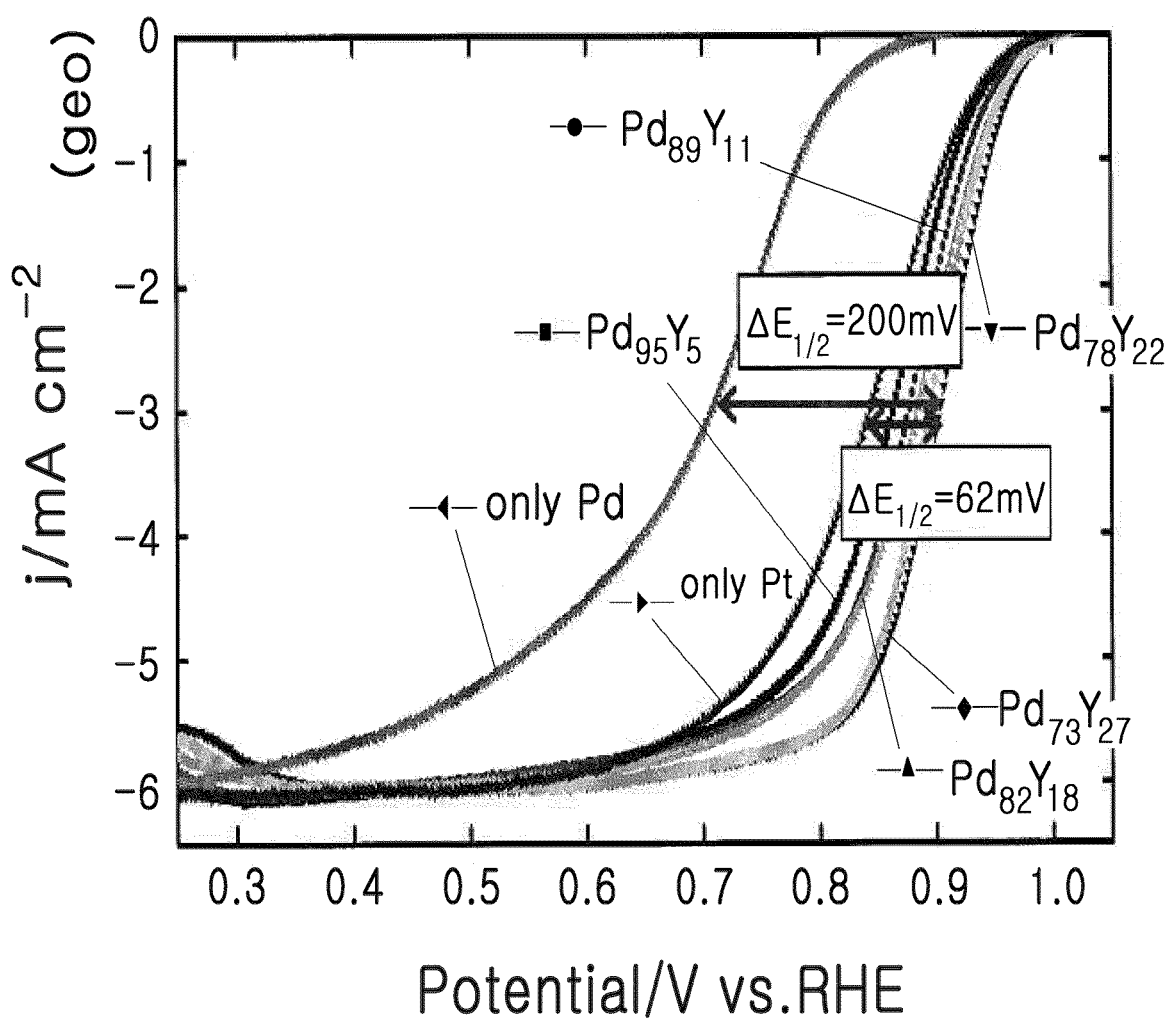
FIG. 1 is a graph showing an oxygen reduction reaction (ORR) activity depending on the composition of a palladium (Pd)-yttrium (Y) alloy [The X-axis represents potential (V vs. RHE) and the Y-axis represents kinetic current density ($j_K$/mAcm$^{-2}$), i.e. activity.]

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The inventors have confirmed that a palladium (Pd)-yttrium (Y) alloy prepared by homogeneously alloying palladium (Pd) with yttrium (Y) may have better activity than platinum (Pt) as well as superior stability.

According to an embodiment, there is provided a catalyst having an activity for an oxygen reduction reaction, comprising a Pd—Y alloy (homogenous alloy).

In the Pd—Y alloy, Y may be included in 1% to 99%, specifically 1% to 50%, more specifically 5% to 32%, further more specifically 11% to 27%, particularly specifically 22% to 27%, and most specifically 22%, based on atomic composition.

Also, according to an embodiment, there is provided a method for preparing a Pd—Y alloy catalyst having an activity for an oxygen reduction reaction, including alloying Pd with Y. The alloying of the Pd—Y alloy catalyst may be achieved by cosputter alloying, colloidal alloying, impregnation alloying or electroplating alloying.

The Pd—Y alloy catalyst may be prepared into nanoparticles through colloidal alloying or impregnation alloying. Considering the high reduction potential of Y, cosputter alloying is advantageous in easiness of preparation.

The cosputter alloying allows various control of the electrode unlike the electrochemical deposition through power control of two or more sputter guns.

With a Pd target loaded in a first sputter gun and Y loaded in a second sputter gun, cosputtering is performed by operating the two guns at the same time. The sputtering proportion may be adjusted by controlling the power of the sputter guns. As a result, the elemental composition of the electrode becomes different and Pd—Y alloy electrodes with various compositions can be prepared.

The power of the sputter gun may be controlled within 30 to 200 watts. Then, the electrode may include 5 to 60 wt % of oxides. The cosputtering may be carried out, for example, under an argon gas atmosphere, and the pressure may be maintained within $1 \times 10^{-3}$ to $10 \times 10^{-3}$ torr.

The colloidal alloying is a method of adding a stabilizer and a reducing agent to a solution containing a Pd precursor and a Y precursor to chemically reduce them. The Pd and Y precursors may be chloride, nitride, acetylacetonate, or the like, and the stabilizer may be various surfactants such as oleylamine, oleic acid, polyvinylpyrrolidone, etc. The reducing agent may be $NaBH_4$ or HCHO. The composition of the alloy may be varied by controlling the amount of the precursors and the kind and amount of the stabilizer and the reducing agent.

The impregnation alloying may be carried out by adding a Y precursor to a Pd/C catalyst, drying at about 100° C. for about 3 hours, performing grinding, and then heat-treating under a reducing atmosphere (hydrogen gas atmosphere) at high temperature (200 to 500° C.). The composition of the alloy may be varied by controlling the amount of the Y precursor and the temperature and time of the reducing at high temperature.

The electroplating alloying is a method of applying a potential or voltage to an electrolyte solution containing a Pd precursor and a Y precursor so that the alloy catalyst is deposited as a result of reduction. The composition of the alloy may be varied by controlling the reduction potential.

Hereinafter, the embodiments of the disclosure will be described in detail together with theoretical basis.

An oxygen reduction reaction (ORR) is a reaction whereby oxygen adsorbed on the catalyst binds with an electron and a proton. Several intermediates (O, OH, OOH) are involved in the oxygen reduction reaction along with the reactant, oxygen, and the final product, water.

Metallic materials such as Pd react with molecular oxygen mainly via an associative mechanism to form OOH. Four electrons are involved in an oxygen reduction reaction. Since the fact that molecular oxygen forms OOH in the state being adsorbed on the metal surface and means that the two oxygen atoms remain bonded without being dissociated, the associative mechanism is clearly distinguished from the dissociative mechanism.

By monitoring the change in free energy during the conversion of molecular oxygen to water via the associative mechanism, it can be determined which step is the rate-determining step (RDS). Roughly speaking, the design of catalyst is to increase the overall reaction rate by facilitating the rate-determining step.

In general, in the associative mechanism, the two steps associated with positive free energy change are the formation of OOH and the formation of water. For pure Pd, these two steps determine the reaction rate. In particular, because OH binds very strongly to the palladium surface and remains stably there, thereby interrupting the reaction of the molecular oxygen, it is the major cause of decreased activity in the oxygen reduction reaction. As for pure Pd, the formation of OOH is accompanied by a very slight increase in energy. Therefore, it may be possible to increase the overall reaction rate by facilitating the formation of water from OH via a heteronuclear bonding between Pd and other transition metal atom.

As for the Pd—Y alloy, the RDS of the overall oxygen reduction reaction may be controlled since the bonding strength with OH may be controlled depending on the content of Y.

In general, since the binding energy of O, which is an intermediate in the oxygen reduction reaction, is similar to those of OH and OOH, it is sufficient to monitor the change of binding energy with O, OOH or OH resulting from the change in electronic structure.

In short, the change in the electronic structure of Pd through alloying is to facilitate the transition of the adsorbed OH to water through modifying the binding energy of the O-containing species.

An appropriate parameter may be helpful in discussing the electronic structure of Pd. The d-band center may be such a parameter.

In an electrochemical reaction of a transition metal, the d-electrons play an important role. It is because the outermost d-band determines most of bonding because it has a very narrow energy gap as compared to other bands (s- or p-band). Quantum mechanically, the narrow band forms bonding/antibonding orbitals. If electrons are filled in the antibonding orbital, the bonding becomes weak. For the antibonding orbital to be filled with electrons, the d-band at the metal surface has to have a wide gap. In an electron energy scale, the increase in the gap is accompanied by the negative shift (or downshift) of the d-band center. Thus, the catalyst for an oxygen reduction reaction may be designed by monitoring the downshift. Accordingly, the d-band center may be an important parameter in (electro)chemical reactions of transition metals and catalyst designs.

In addition to activity, stability has to be considered because a metal that weakly binds with Pd results in an alloy with poor stability. In this regard, heat of alloy formation energy needs to be considered.

In consideration of both activity and stability, the embodiments of the disclosure present alloying of Pd with Y.

Since the upshift and downshift of the d-band center result in both fast and slow steps, the activity of an oxygen reduction reaction may be enhanced by adequately changing the electronic structure of the catalyst so as to increase the overall reaction rate.

The inventors further studied the change in activity depending on the atomic composition of Pd and Y.

They carried out alloying of Pd and Y while performing experiments at various compositions to change the electronic structure. Surprisingly, they found out that the activity increases up to a certain Y content and decreases again beyond the content. The Pd—Y alloy according to the disclosure is not a near-surface alloy formed on the surface of Pd but a homogeneous alloy. Such a homogeneous alloy with a uniform composition of Pd and Y exhibits a superior activity for an oxygen reduction reaction as well as excellent stability due to very high heat of alloy formation.

EXAMPLES

The examples and experiments will now be described. The following examples and experiments are for illustrative purposes only and not intended to limit the scope of this disclosure.

First, a palladium (Pd)-yttrium (Y) alloy catalyst electrode for a polymer fuel cell was prepared by cosputtering. After loading a Pd target (99.99%, LTS Inc., USA) in a first sputter gun and Y (99.99%, LTS Inc., USA) in a second sputter gun, the two guns were operated at the same time. The power of the Pd gun was fixed at 100 W and that of the Y gun was varied from 30 to 180 W. Through this cosputtering method, Pd—Y alloy electrodes with various compositions were prepared as will be described later. The cosputtering was performed under an argon gas atmosphere and the pressure was maintained at $1 \times 10^{-3}$ to $10 \times 10^{-3}$ torr.

Electrochemical properties of thus prepared electrode were tested using a three electrode cell system. The prepared electrode was used as a working electrode, and a Pd wire and a saturated calomel electrode (SCE) were used as a counter electrode and a reference electrode, respectively. The catalytic activity was compared in a 0.1 M perchloric acid ($HClO_4$) solution saturated with oxygen. The working electrode was a rotating disk electrode (RDE) made of glassy carbon. Pd—Y with varying composition had been deposited on the RDE electrode by the cosputtering.

FIG. 1 is a graph showing an oxygen reduction reaction activity depending on the composition of Pd—Y. The X-axis represents potential (V vs. RHE) and the Y-axis represents kinetic current density ($j_K$/mAcm$^{-2}$), i.e. activity.

As seen from FIG. 1, alloying of Pd with Y results in better oxygen reduction reaction activity than Pd or platinum (Pt).

And, surprisingly, the oxygen reduction reaction activity of the Pd—Y alloy increased as the Y content increased from 5% to 11% to 18% and to 22%, but decreased as the Y content further increased to 27% and to 32%.

Figure 2:
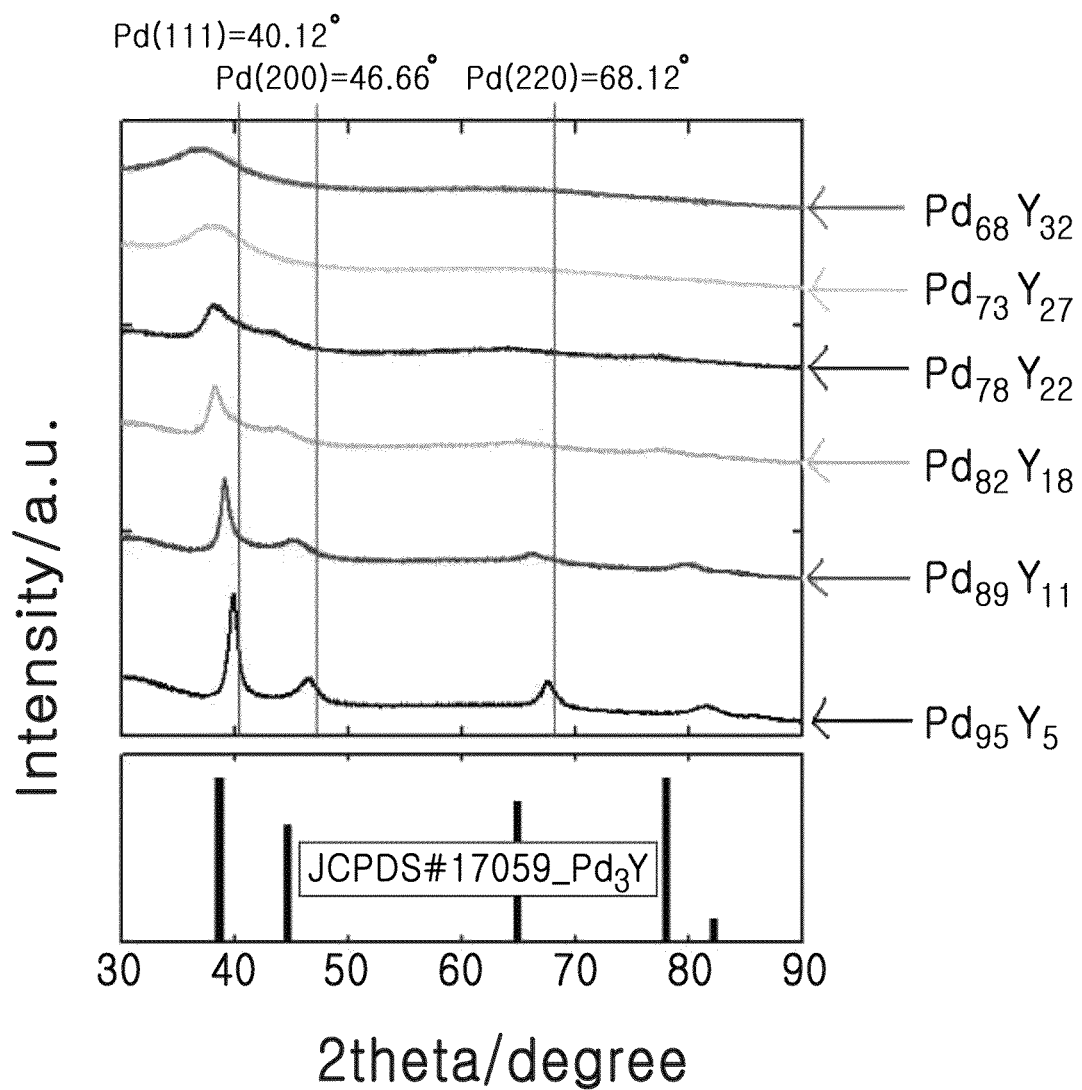
FIG. 2 is an XRD graph showing the change in lattice structure of the Pd—Y alloy depending on composition [The X-axis represents 2 theta (degree) and the Y-axis represents Y-axis intensity (arbitrary unit).]

FIG. 2 is an XRD graph showing the change in lattice structure of the Pd—Y alloy depending on composition. The X-axis represents 2 theta (degree) and the Y-axis represents Y-axis intensity (arbitrary unit).

Referring to FIG. 2, the Pd(111) plane showed the highest intensity. From the change in peak positions (change in 2 theta), the distance between neighboring Pd atoms can be measured. In pure Pd, the Pd(111) peak is observed at 40.12°. If the peak is observed at a smaller angle (<40.12°, the distance between Pd atoms is larger. In the tested Pd—Y alloy catalyst, the distance between Pd atoms was larger than in pure Pd. A search of the standard XRD data file of the Joint Committee on Powder Diffraction Standards (JCPDS) revealed that $Pd_{78}Y_{22}$ was the most similar to $Pd_3Y$ among the prepared alloy catalysts.

Figure 3:
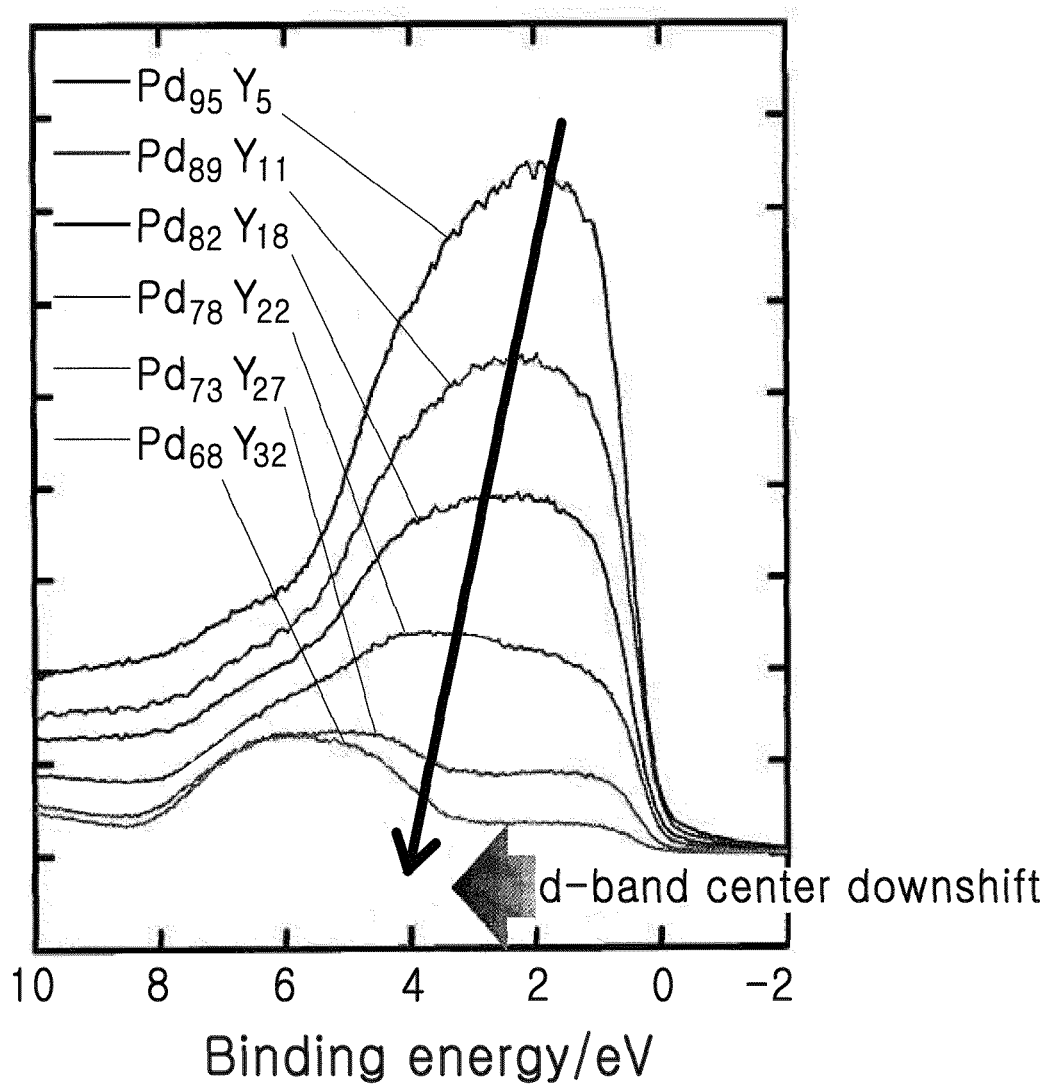
FIG. 3 is a graph showing d-band center downshift in the Pd—Y alloy depending on the composition of Y [The X-axis represents binding energy (eV) and the Y-axis represents intensity (arbitrary unit).]

FIG. 3 is a graph showing d-band center downshift in the Pd—Y alloy depending on the composition of Y. The X-axis represents binding energy (eV) and the Y-axis represents intensity (arbitrary unit).

Figure 4:
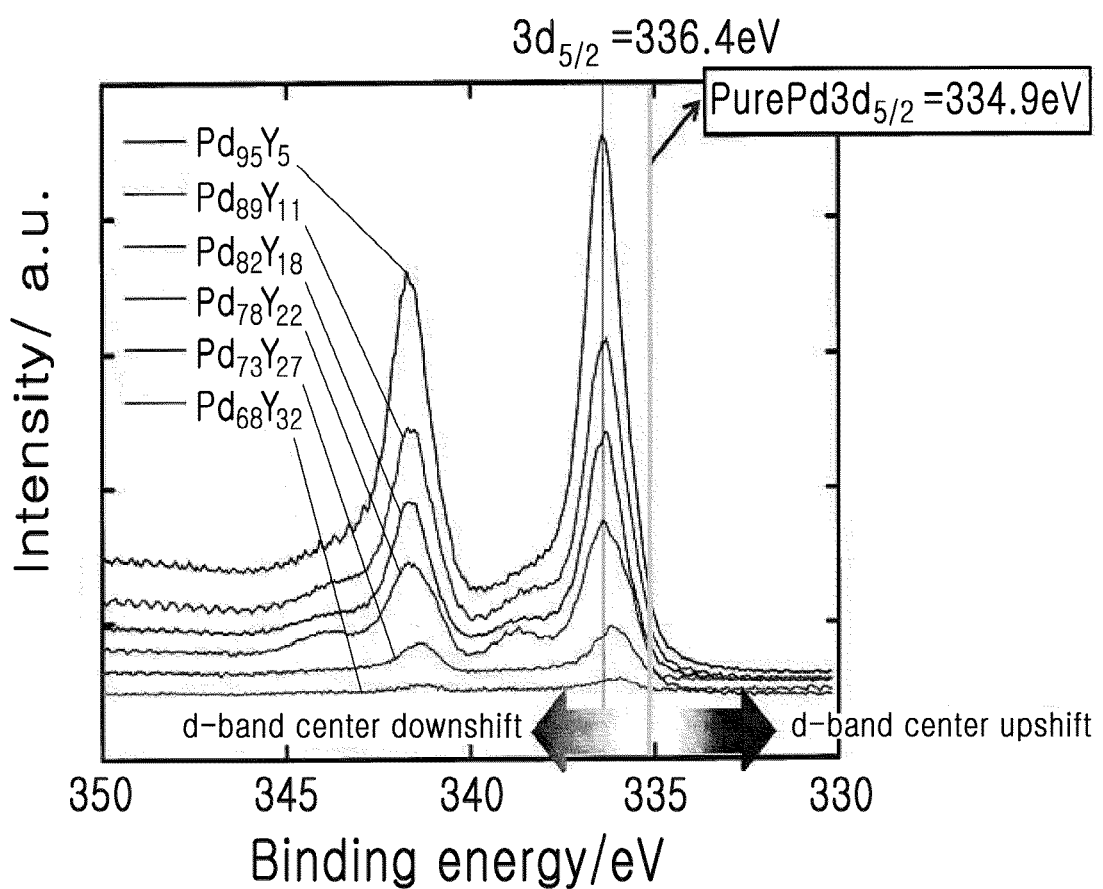
FIG. 4 is an XPS graph confirming d-band center downshift in the Pd—Y alloy depending on the composition of Y [The X-axis represents binding energy (eV) and the Y-axis represents intensity (arbitrary unit).]

FIG. 4 is an XPS graph confirming d-band center downshift in the Pd—Y alloy depending on the composition of Y. The X-axis represents binding energy (eV) and the Y-axis represents intensity (arbitrary unit).

As seen from FIG. 3, the Pd—Y alloy showed d-band center downshift. This can also be confirmed from the XPS graph of FIG. 4. The downshift explains the high oxygen reduction reaction activity of the Pd—Y alloy.

Considering the d-band theory, a larger distance between Pd atoms will result in an upshift of the d-band center with reference to the Fermi level. This means a stronger binding energy between the catalyst and oxygen and hence will negatively affect the catalytic activity. Accordingly, it is needed to design the Pd alloy catalyst such that the oxygen binding energy of the catalyst is decreased. In this aspect, it may seem that the alloying of Pd with Y is inappropriate since it leads to d-band center upshift. Actually however, the Pd—Y alloy according to the embodiments of this disclosure results in d-band center downshift and thus exhibits superior oxygen reduction reaction activity.

Figure 5:
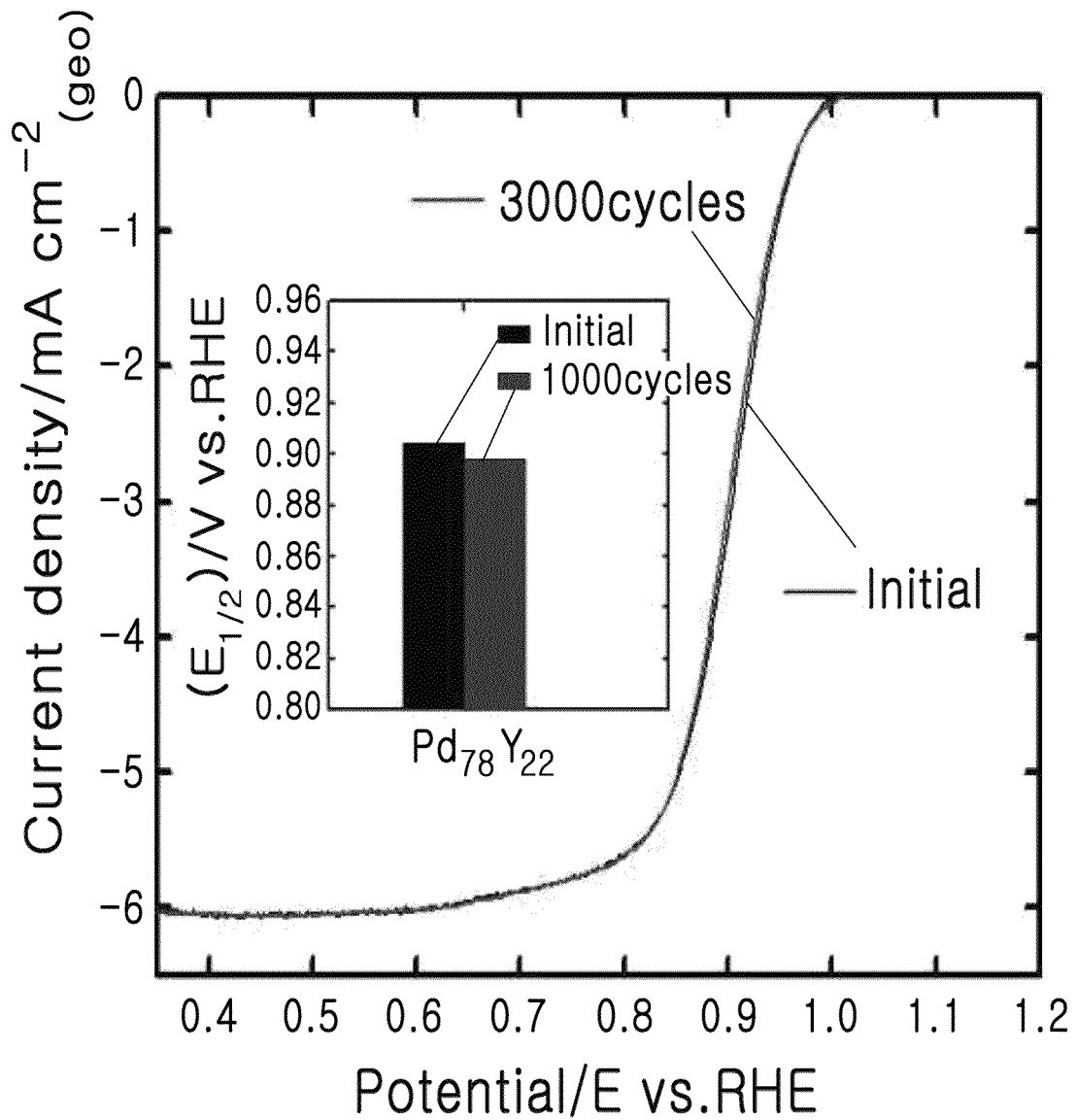
FIG. 5 is a graph showing a result of repeating oxygen reduction cycles under a strongly acidic atmosphere in order to confirm stability of $Pd_{78}Y_{22}$ [The X-axis represents potential (V vs. RHE) and the Y-axis represents kinetic current density ($j_K$/mAcm$^{-2}$), i.e. activity. The bar graphs inserted in FIG. 5 compare initial potential ($E_{1/2}$) with that after 3000 cycles].

FIG. 5 is a graph showing a result of repeating oxygen reduction cycles under a strongly acidic atmosphere in order to confirm the stability of $Pd_{78}Y_{22}$. The X-axis represents potential (V vs. RHE) and the Y-axis represents kinetic current density ($j_K$/mAcm$^{-2}$), i.e. activity. The bar graphs inserted in FIG. 5 compare initial potential ($E_{1/2}$) with that after 3000 cycles]

As seen from FIG. 5, the Pd—Y alloy showed superior stability even after 3000 cycles, with little change in potential and current density.

As described, the Pd—Y alloy (homogeneous alloy) according to the disclosure shows superior oxygen reduction reaction activity as compared to Pt. Such a superior activity cannot be achieved with the existing Pt-free catalysts. In addition, the Pd—Y alloy catalyst also shows excellent stability, which is another important factor in oxygen reduction reaction.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A palladium-yttrium alloy catalyst consisting of an alloy of palladium and yttrium and having an activity for an oxygen reduction reaction, wherein the palladium-yttrium alloy is a totally homogeneous alloy, and yttrium is comprised in 18% to 22% of the alloy based on atomic composition.

2. The palladium-yttrium alloy catalyst according to claim 1, wherein the palladium-yttrium alloy exhibits stability.

3. A palladium-yttrium alloy catalyst consisting of an alloy of palladium and yttrium and having an activity for an oxygen reduction reaction, wherein the palladium-yttrium alloy is a totally homogeneous alloy, wherein yttrium is comprised in 22% of the alloy based on atomic composition.

4. A fuel cell comprising the palladium-yttrium alloy catalyst according to claim 3 in a fuel cell electrode.

5. A method for preparing a palladium-yttrium alloy catalyst having an activity for an oxygen reduction reaction, consisting of alloying palladium with yttrium, wherein the palladium-yttrium alloy is a totally homogeneous alloy, and yttrium is comprised in 18% to 22% of the alloy based on atomic composition.

6. The method for preparing a palladium-yttrium alloy catalyst according to claim 5, wherein said alloying comprises cosputter alloying, colloidal alloying, impregnation alloying or electroplating alloying.

7. A fuel cell comprising a palladium-yttrium alloy catalyst in a fuel cell electrode, wherein the palladium-yttrium alloy catalyst consists of an alloy of palladium and yttrium and has an activity for an oxygen reduction reaction, and the palladium-yttrium alloy is a totally homogeneous alloy, wherein yttrium is comprised in 11% to 22% of the alloy based on atomic composition.

8. A fuel cell comprising a palladium-yttrium alloy catalyst in a fuel cell electrode, wherein the palladium-yttrium alloy catalyst consists of an alloy of palladium and yttrium and has an activity for an oxygen reduction reaction, and the palladium-yttrium alloy is a totally homogeneous alloy, wherein yttrium is comprised in 18% to 22% of the alloy based on atomic composition.

9. A method for improving an activity for an oxygen reduction reaction of a palladium-yttrium alloy catalyst in a fuel cell electrode used in a fuel cell comprising: alloying palladium with yttrium so that the palladium-yttrium alloy is a totally homogeneous alloy and has an activity for an oxygen reduction reaction, wherein the palladium-yttrium alloy catalyst consists of an alloy of palladium and yttrium, and yttrium is comprised in 11% to 22% of the alloy based on atomic composition.

10. The method according to claim 9, wherein yttrium is comprised in 18% to 22% of the alloy based on atomic composition.

* * * * *